US006383282B1

(12) United States Patent
Chaiko (10) Patent No.: US 6,383,282 B1
(45) Date of Patent: May 7, 2002

(54) PSEUDOPHASIC EXTRACTION METHOD FOR THE SEPARATION OF ULTRA-FINE MINERALS

(75) Inventor: David J. Chaiko, Naperville, IL (US)

(73) Assignee: The University of Chicago, Chicago, IL (US)

( * ) Notice: Subject to any disclaimer, the term of this patent is extended or adjusted under 35 U.S.C. 154(b) by 0 days.

(21) Appl. No.: 09/532,728

(22) Filed: Mar. 22, 2000

(51) Int. Cl.⁷ .............................. B03B 5/30; C01B 33/12
(52) U.S. Cl. .................... 106/486; 209/172; 209/172.5; 106/487; 106/287.1; 106/287.17
(58) Field of Search .................... 106/287.1, 287.17, 106/486, 487; 501/141, 148; 209/5, 10, 172, 172.5, 166

(56) References Cited

U.S. PATENT DOCUMENTS

| | | | | |
|---|---|---|---|---|
| 3,539,003 A | * | 11/1970 | Bidwell | 209/5 |
| 3,837,482 A | * | 9/1974 | Sheridan, III | 209/5 |
| 3,857,781 A | * | 12/1974 | Maynard | 209/5 |
| 3,862,027 A | * | 1/1975 | Mercade | 209/5 |
| 5,104,551 A | * | 4/1992 | Davis et al. | 210/727 |
| 5,411,149 A | * | 5/1995 | Chaiko et al. | 209/172.5 |
| 5,625,862 A | * | 4/1997 | Chaiko et al. | 423/3 |
| 6,068,693 A | * | 5/2000 | Garforth et al. | 106/487 |

FOREIGN PATENT DOCUMENTS

GB      2059811 A   *   4/1981

* cited by examiner

Primary Examiner—Michael Marcheschi
(74) Attorney, Agent, or Firm—Foley & Lardner (57) ABSTRACT

An improved aqueous-based extraction method for the separation and recovery of ultra-fine mineral particles. The process operates within the pseudophase region of the conventional aqueous biphasic extraction system where a low-molecular-weight, water soluble polymer alone is used in combination with a salt and operates within the pseudobiphase regime of the conventional aqueous biphasic extraction system. A combination of low molecular weight, mutually immiscible polymers are used with or without a salt. This method is especially suited for the purification of clays that are useful as rheological control agents and for the preparation of nanocomposites.

31 Claims, 8 Drawing Sheets

PSEUDOPHASIC EXTRACTION METHOD FOR THE SEPARATION OF ULTRA-FINE MINERALS

This invention was made with Government support under Contract No. W-31-109-ENG-38 awarded by the U.S. Department of Energy. The Government has certain rights in this invention.

FIELD OF THE INVENTION

The present invention relates to a method for ultra-fine particle separation, such as for purification and recovery of clays for use as rheological control agents and for use in the preparation of nanocomposites. More particularly, the invention relates to an improved aqueous based pseudophasic extraction method for the simultaneous surface modification and purification of exfoliated clays.

BACKGROUND OF THE INVENTION

There are numerous biphasic extraction methods currently known for the purification of clays which are intended for use as theological control agents in a wide range of water-based products including inks, paints, coatings, cosmetics, lubricants, greases, caulks, pharmaceuticals, fertilizers, pesticides, oil drilling muds, binders, and adhesives. In the area of ultra-fine particle separation, one method is an aqueous biphasic extraction (ABE) process which involves a heterogeneous liquid/liquid method wherein species partition between two immiscible aqueous phases. The extraction system is typically generated by combining an aqueous salt solution with an aqueous polymer solution. Example polymers that can be used are polyethylene glycol, polyvinyl alcohol, polyvinylpyrrolidone, and polypropylene glycol. An ABE method produces two distinct liquid layers that are immiscible, yet each liquid layer contains over 70% water. Some examples of inorganic salts that can be used to form ABE systems in combination with polymers such as polyethylene glycol include the sodium salts of carbonate, sulfate, phosphate, and hydroxide. The selective partitioning of particulates in ABE systems is based on complex physicochemical interactions between the particle surface and the liquid phases, rather than bulk phase properties like density. An ABE system can be operated in a continuous, counter-current fashion to achieve high levels of selective separation. The operating conditions for previous conventional ABE methods involve a strict two-phase regime in which the selective partitioning of ultrafine particulates occurs between the bulk liquid phases.

While biphasic separation processes are well developed, there still remain substantial problems in separating certain substances by this methodology. For example, silica-based minerals such as quartz, cristobalite, and opal are considered impurities in numerous common minerals, such as clays. Historically, efficient and inexpensive methods for the separation and recovery of phyllosilicates, kaolin and smectite clays in particular, from silica-based minerals (for example opal in smectite clays) has been unavailable. The issue in kaolin purification concerns the removal of smectites, cristobalite, and iron and titanium containing minerals. Current approaches used in the purification of clays, especially smectite clays, involve sequential treatment of an aqueous clay slurry in a number of unit operations including high shear dispersion, sodium exchange, and particle size separation. The latter series of unit operations may include screens, hydrocyclones, low-speed centrifuges, and high-speed centrifuges. Treatment approaches that include high-speed centrifugation, as exemplified by the use of a disc centrifuge, are highly energy intensive and expensive to maintain due to rapid abrasion of the processing equipment. In addition, these processes all suffer from an inability to separate mineral impurities from the clay in cases where the particle size distributions of the various mineral impurities overlap with that of the clay minerals. One example of a particularly difficult separation that has resisted traditional methods is the removal of opal from smectite clays, and another example is the removal of titanium dioxide from kaolins.

Furthermore, under prior art methods it has not been possible to make nanoscale particle/particle separations based on surface chemical characteristics. This ability is provided by the present invention and makes it possible to separate exfoliated clay platelets having a thickness of about 10 Å from platelets that remain stacked in naturally occurring booklets (i.e., stacks of individual clay crystals arranged like the pages in a book to form agglomerations of stacked, non-exfoliated clay particles). The homogeneous dispersion, on the nanoscale level, of the clay platelets throughout a composite matrix as individual platelets of about 10 Å thickness is regarded as a key characteristic of nanocomposites and distinguishes such materials from conventional plastic/mineral composites. Thus, the purified clays produced by this invention are particularly well suited for incorporation as nanocomposites since the process selectively recovers highly purified clays on the basis of surface chemical characteristics.

It is therefore an object of the invention to provide a novel article of manufacture and method of separating clay from clay impurities.

It is another object of the invention to provide a novel article of manufacture and method for separating a preferred mineral, element or chemical composition from a matrix including, without limitation, mineralogical compositions, rocks, soils, ores, mineral-containing waters and the like, whether processed or unprocessed.

It is still another object of the invention to provide a novel article of manufacture and method for recovering a preferred element, mineral or composition from an industrial waste, treated or untreated, including, without limitation, wastewater, solid waste, fly ash, byproducts of combustion, products of combustion residue and the like.

It is another object of the invention to provide an aqueous pseudophasic extraction method for separating clay from clay impurities.

It is a further object of the invention to provide a novel article of manufacture and phase separation method which produces very high surface chemical purity clay when applied to a clay feed.

It is still another object of the present invention to provide a novel article of manufacture and method for recovering exfoliated clays from clay/impurity mixtures.

It is another object of the present invention to provide a novel article of manufacture and method for preparing highly purified clays from clay/impurity mixtures at a reduced cost compared to current clay purification methods.

It is yet another object of the present invention to provide an improved article of manufacture and a particle/particle separation method which utilizes a pseudophasic system to selectively form a polymeric coating on particles of a mineral such as clay to enhance particle/particle separation.

It is yet an additional object of the invention to provide a novel article of manufacture and method for preparing highly purified clays which can be used to control the rheology of aqueous-based systems.

It is also another object of the invention to provide an improved article of manufacture and a method of aqueous-based, pseudo-biphasic extraction for separating and recovering clay from clay ores, soils, impure clays and the like.

It is another object of this invention to provide a novel article of manufacture and method for preparing highly purified clays which are incorporated into polymeric systems as nanocomposites.

It is another object of this invention to provide a novel method for preparing surface-treated clays for use in foods, pharmaceuticals, cosmetics, and fire retardants.

It is another object of this invention to provide highly purified clays for further treatment with existing technologies to produce organophillic clays.

Further objects and advantages of the present invention, together with the organization and manner of operation thereof, will become apparent from the following detailed description of the invention when taken into conjunction with the accompanying drawings.

SUMMARY OF THE INVENTION

In one form of the present invention, a purified clay is provided by the treatment of an ore or other material which contains a clay and one or more impurities. Impurities can be any material from any source except the desired clay product and can include mineral or chemical impurities from any source and unexfoliated clay particles. Other forms of the invention provide an article of manufacture and method for separating a preferred mineral, element or chemical compound from a matrix including, without limitation, mineralogical compositions, rocks, soils, ores, mineral-containing waters and the like, whether processed or unprocessed or for recovering a preferred element, mineral or other composition from an industrial waste, treated or untreated, and including, without limitation, wastewater, solid waste, fly ash, byproducts of combustion, products of combustion residue and the like.

In the case of clays being purified, the clay is preferably purified by dispersing a quantity of finely-divided raw clay feed in water along with a water-soluble polymer, such as polyethylene glycol, to form a pseudophase. The water-soluble polymer is preferably added in a sufficient amount to form a substantially monomolecular coating of the polymer on the basal surfaces of the clay. Excess amounts of the polymer can also be used in the process without detriment and can in some cases be beneficial. In some embodiments, an inorganic salt, preferably a monovalent metal salt, such as sodium carbonate, can be added to substitute sodium for exchangeable calcium or magnesium ions in the clay. Utilizing the salt also improves the performance of the extraction method and improves dispersion and exfoliation of the clay. Another polymer, such as polypropylene glycol, can also be added to the mixture to preferentially coat the surfaces of the impurity and form a pseudo-biphase. Mixing is typically carried out for about ten to sixty minutes at an elevated temperature in the range of about 40 to 70° C. Under these mixing conditions, a polypropylene glycol phase, undergoes a density inversion and becomes more dense than water and is separated out leaving a substantially impurity free clay. Further, the two polymers are preferably added sequentially rather than simultaneously in order to enhance the effectiveness of the process.

The above described objects and embodiments are set forth in the following description and illustrated in the drawings described hereinbelow.

DETAILED DESCRIPTION OF THE PREFERRED EMBODIMENTS

This invention is directed to an improved, aqueous-based extraction method for the purification of clays which can then be used, for example, as rheological control agents and in the preparation of nanocomposites. This invention is further directed in part to an improved aqueous biphasic extraction (ABE) article of manufacture and method for the purification and exfoliation of clays used as rheological control agents in a wide range of water-based, as well as non-water based, products including inks, paints, coatings, cosmetics, lubricants, greases, caulks, pharmaceuticals, fertilizers, pesticides, oil drilling muds, binders, and adhesives. The resulting purified clays are particularly suited for incorporation as nanocomposites (after further surface modification) since the process selectively recovers highly purified clays on the basis of surface chemical characteristics. Heretofore, it has not been possible to make nanoscale particle/particle separations based on surface-chemical characteristics. This methodology makes it possible to separate exfoliated clay platelets having a thickness of about 10 Å from platelets that remain stacked in naturally occurring booklets. The homogeneous dispersion, on the nanoscale, of the clay platelets throughout a composite matrix as individual platelets of about 10 Å thickness is regarded as a key characteristic of nanocomposites and distinguishes such materials from conventional mineral-filled plastic composites. The purified clays can be further treated to optimize the surface chemical properties for specific applications. An example involves the surface treatment of the purified clay for use in preparing a nanocomposite material whereby the inorganic exchangeable ions are replaced by hydrophobic onium ions such as alkyl ammonium, sulfonium, and phosphonium cations.

Clays that can be purified by the present invention include at least the smectites, (such as saponite, hectorite, sauconite, montmorillonite, beidellite, nontronite, etc.), kaolins (such as kaolinite, dickite, nacrite, etc), and mixtures thereof, and is believed to be useful for purification of the broader class of layered silicates i.e., phyllosilicates, such as serpentines, talcs, pyrophyllites, vermiculities, micas, brittle micas, chlorites, sepiolites, and palygorskites. By choice of process conditions, it is possible to separate the various phyllosicates from each other and from other mineral phases.

The types of clays normally considered for use as rheological control agents and for the preparation of nanocomposites include, for example, hectorite, montmorillonite, beidellite, stevensite, and saponite. The clay impurities can include, but are not limited to: nonexfoliated clays, and clay minerals having a layer charge outside the normal range for smectitic clays (e.g., kaolinite, dickite, nacrite, chrysotile, lizardite, amesite, antigorite, willemseite, talc, pyrophyllite, vermiculite, phlogopite, biotite, lepidolite, muscovite, paragonite, clintonite, anandite, margarite, clinochlore, dombassite, cookeite, sepiolite, and galygorskite), silicates (e.g., feldspars, amphiboles, magadiite, mullite, zircon, pyroxines, plagioclase feldspars, and olivine), oxides and hydroxides (e.g., gibbsite, boehmite, bayerite, brucite, goethite, hermatite, magnetite, maghemite, spinels, quartz, tridymite, opal-CT, cristobalite, diaspore, illimenite, rutile, anatise, brookite, corundrum, and uraninite), carbonates (e.g., calcite, dolomite, trona, aragonite, strontianite, siderite, magnesite, forsterite, rhodochrosite, and ankerite), sulfates (e.g., alunite, gypsum, barite, epsomite, and jarosite), sulfides (e.g., pyrite, marcasite, and griegite), zeolites (e.g., heulandite, clinoptilolite, analcime, and phillipsite) and phosphates (e.g., all minerals of the apatite group, monazite).

The method can be operated in what is normally considered to be a monophasic regime of the phase diagram. In another viewpoint of the invention the method operates in a pseudo-biphasic region, as explained in further detail hereinbelow. The operating conditions which lead to the efficient separation of the clay from the clay impurities in the present invention do not involve particulate partitioning between bulk liquid phases as found in true biphasic extraction systems. The phase diagram of an aqueous biphasic extraction system defines whether the system is operating in a monophasic region, a pseudophasic region or a biphasic region. The formation of a pseudophasic system does not depend on the presence of particulate phases, such as clays or other mineral phases. When the polymers (e.g., polyethylene glycol, hereinafter "PEG") wet the clay surface and form a monolayer, the clay particle becomes in effect an extension of the polymeric pseudophase. Thus, it does not matter if excess polymer is present or if the ratio of polymer to clay is insufficient to form a complete polymer monolayer. The fact that the mineral particle becomes an extension of the pseudophase is demonstrated by the fact that clays purified with, and containing a monolayer coating of PEG, will not disperse in aqueous polymer solutions in which the two types of polymers themselves are immiscible, such as in PEG/polyvinyl alcohol, PEG/polyvinylpyrrolidone, PEG/dextrans and PEG/polypropylene glycol (hereinafter "PPG"). Because of the presence of the mineral phase and because it becomes an extension of the pseudophase through the combination of the mineral particle with the monolayer polymer coating, the particles with different polymer coatings phase separate from each other. Operating at elevated temperatures maximizes the density difference between the PEG/PPG systems where the PPG has a density greater than 1.0. However, if the process is operated at too high a temperature, the PEG density undergoes an inversion and approaches that of the PPG, thereby reducing the efficiency of the system.

In a sense, the volume of the particle acts to increase the volume of the pseudophase, causing it to become in effect a special class of biphase system. The distinction between the conventional ABE system and this one is in the position of the system composition (in the absence of the mineral particulates) within one of a water/polymer/salt, or water/polymer/polymer, or water/polymer/polymer/salt phase diagram which happens to be in the pseudophasic regime—referred to as the monophase regime in past literature. The clay impurities which are wetted by PPG become extensions of the PPG pseudophase. The pseudophase and pseudobiphase are distinct from typical biphases because true biphasic separations utilize two bulk liquid phases, as opposed to the colloid-sized aggregations of polymer which exist in the monophasic region of the phase diagram as disclosed by the present invention. Furthermore, the disclosed methods may be operated in a single stage or multiple stages as is well known in the art, such as, for example utilizing flotation.

Small angle neutron scattering studies have shown that for the disclosed method the polymers exist as a pseudophase comprised of well-defined colloidal particle size distributions of aggregates of the polymers dispersed in a continuous, aqueous salt solution heretofore identified in the literature as the monophase region of the phase diagram. See, for example, P. Thiyagarajan, D. J. Chaiko, and R. P. Hjelm Jr., "A Neutron Scattering Study of Poly(ethylene glycol) in Electrolyte Solutions, Macromolecules 28", 7730–7736, 1995 (discussing formation of pseudophase aggregates of polymers in aqueous salt solutions). This publication is merely referenced for purposes of understanding the conventional use of neutron scattering to determine the presence of pseudophases on a molecular scale and is not necessary for an enabling disclosure herein. These aggregates which are identified by neutron scattering form spontaneously, are thermodynamically stable, and are homogeneously dispersed throughout the extraction system.

The present methods of processing clays can thus also be described as pseudophasic extraction methods. These colloidal-size polymer aggregates are distinct from common micellar structures produced by amphiphilic, surface-active molecules. Thus, in the instant case the polymers used do not contain an amphiphilic structure, and the aggregates they produce are not the product of specific polymer segment interaction, as in the case of block copolymers which possess an amphiphilic structure. However, the present method is further believed to be effective in utilizing polymers which do happen to contain amphiphilic structures, such as block copolymers, and which can form micelles and exhibit a critical micelle concentration.

Consequently, in one form of the invention a water-soluble polymer is mixed with a salt or combination of salts in which at least one of the salts contains an organic or inorganic lyotropic ion, such as the sodium salts of carbonate, sulfate, phosphate, tungstate, molybdate, chromate, selenate, selenite, silicate, hydroxide, hexametaphosphate, pyrophosphate, acetate, formate, citrate, succinate, tartarate, and oxalate. This can be described as a pseodophase extraction method. In another form of the invention, combinations are formed of two or more water-soluble polymers with or without a lyotropic salt, and this can be described as a pseudo-biphasic extraction method.

The pseudophase separation of the polymers used in the present invention occurs in the monophase region of the phase diagram and is an entropy-driven process and leads to polymer aggregation.

The polymer pseudophases used in the present invention occur in the region of the water/polymer/salt, water/polymer/polymer, and water/polymer/polymer/salt phase diagrams that have conventionally been referred to as monophasic. The formation of the pseudophase is an entropy-driven process and is promoted by the presence of either organic or inorganic lyotropic ions. Salt ions, which are preferably lyotropic, can also be utilized to increase the structuring of the water in the aqueous phase and further promote polymer aggregation. The growth of the polymer aggregates that results from increasing concentrations of lyotropic salts eventually produces the conventional aqueous biphasic extraction systems.

The ability to operate an efficient particle/particle separation system in the monophase region of the phase diagram offers a number of technical and economic advantages. For example, lower concentrations of salts and polymers reduce the cost of generating the extraction system; and the concentrations reduce the amounts of biphase forming components that are lost to product and waste streams. Product recovery does not require a separate solid/liquid separation process to recover the purified clay from a concentrated polymer solution. Reduced salt concentrations result in better dispersion of the mineral phases and therefore enable higher levels of purification to be achieved.

In one form of the invention a clay slurry is prepared by the dispersion of a clay ore in water or optionally, an aqueous solution containing a dispersent and/or sodium exchange salt, with the particle size of the ore having been reduced sufficiently by grinding to ensure rapid particle dispersion. The largest size of the clay feed would preferably be about 325 mesh to 100 mesh. Although finer particle sizes improve the efficiency of the separation process and the extent of clay recovery, there is a trade off in the form of higher grinding costs, longer residence times in the grinding circuit and correspondingly reduced throughput. Conventional size separation processes, which can include screens and hydrocyclones, are used to prepare the clay feed for the pseudophasic extraction process. Preferably, the clay feed, or slurry, is utilized as soon as is possible after the ore is ground or separated into smaller particles as freshly ground or separated mixtures of clay-impurities are believed to have surface chemistry characteristics which are more favorable for the purification of the clay. A water-soluble polymer is added to the clay slurry. Typically, these polymers are nonionic polymers or copolymers, especially random copolymers, but very low molecular weight ionic polymers or copolymers may be utilized provided the molecular weight is low enough to prevent interparticle bridging and flocculation.

Preferred examples of the water-soluble polymers include without limitation at least polyethylene glycol, monomethoxypolyethylene glycol, dimethoxypolyethylene glycol, polyvinyl alcohol, polyvinylpyrrolidone, polyethylene glycol derivatives such as polyethylene glycol acrylate, polyethylene glycol diacrylate, polyethylene glycol methyl ether acrylate, polyethylene glycol methacrylate, polyethylene glycol dimethacrylate, polyethylene glycol methyl ether methacrylate, polyethylene glycol methyl ether epoxide, polyethylene glycol diglycidal ether, polyethylene glycol phenyl ether acrylate, polyethylene glycol bisphenol A diglycidyl ether, polyethylene glycol dibenzoate, polyethylene glycol bis(3-aminopropyl), polyethylene glycol butyl ether, polyethylene glycol dicarboxymethyl ether, polyethylene glycol divinyl ether, and miscible combinations of one or more water-soluble polymers. The low-molecular weight of the water-soluble polymers functions, in part, to avoid interparticle bridging and consequent loss of separation selectivity. Higher molecular weight polymers can also be used provided that the polymer does not act as a flocculant in the aqueous extraction system.

In the most preferred embodiment, the concentration of the water-soluble polymer should be sufficient to produce at least a complete monomolecular coating on substantially all exposed basal surfaces of the clay. For example, for hectorite, montmorillonite, and saponite polyethylene glycol is typically added at the ratio of 0.27 gram polyethylene glycol per gram of clay. Excess amounts of water-soluble polymer can be added without degrading the performance of the separation method or affecting the effectiveness of forming a monomolecular coating on the basal surfaces of the clay particles. Water-soluble polymer concentrations below those needed to produce a substantially complete monomolecular layer coating on the basal surfaces of the clay can also be used, but can result in diminished purification capability. However, sub-monolayer concentrations of the water-soluble polymer can be advantageous when further surface modification of the purified clay is desired.

The water-soluble polymer is typically added with sufficient mixing time to ensure substantially complete clay exfoliation and adsorption of a substantially complete monomolecular coating on the basal surfaces. Mixing times of about 30 to 60 minutes are typically sufficient. If the clay contains significant amounts of exchangeable calcium or magnesium, sodium salts can be supplied at this point to effect sodium exchange of the clay. The salt concentrations are preferably held to the stoichiometric amounts needed to complete the sodium exchange. The salts used can include, without limitation, sodium carbonate, sodium phosphate, sodium hydroxide, sodium silicate, sodium citrate, sodium formate, sodium acetate, sodium oxalate, sodium hexametaphosphate, tetrasodium pyrophosphate, sodium polyphosphate, tetrasodium salt of 1-hydroxy ethyliden (1,1-diphosphonic acid), pentasodium salt of dithylenetriamine penta(methylenephosphonic acid), sodium phytate, and mixtures thereof. These salts can also be used in combination with other salts, including, without limitation, alkali and alkaline earth salts of nitrate and chloride, or with salts that can be used to control the redox potential of the clay surface, for example sodium sulfite. The alkaline earth salts are used if operating the process for the purpose of producing nonexfoliated clays. Salts that lead to decreased water structure and do not promote polymer aggregation, such as sodium nitrate, sodium nitrite, and sodium chloride, are preferably not used.

The presence of small concentrations of any of the above salts can affect the colloidal properties of the polymers causing significant growth of the polymer aggregates. These colloidal properties can have significant influence on the separation of impurities from the clays as is illustrated by example below. In the pseudophase form of the invention, only water-soluble polymers are used in conjunction with aqueous salt solutions without the presence of another polymer, as described below, to achieve separation and recovery of the clay from the impurities. Pseudophase refers to the presence of a polymer pseudophase in the monophase region of a water/polymer/salt phase diagram.

In the pseudo-biphasic form of the invention, another polymer, preferably a hydrophobic polymer that is at least minimally miscible in water can also be added to further facilitate the separation of the clay from the impurity. However, in other embodiments the polymer does not have to be partly miscible with water. Any combination of polymers could be used as long as the polymers are only partly miscible with each other or are even immiscible with each other. Examples of polymer combinations producing pseudo-biphasic systems include, but are not limited to: polyethylene glycol/dextran, polyethylene glycol/dextran sulfate, polyethylene glycol/polyvinyl alcohol, polyethylene glycol/polyacrylamide, polyethylene glycol/hydroxypropyl dextran, polyethylene glycol/polyvinyl pyrrolidone, polyvinyl pyrrolidone/polyvinyl alcohol, polyvinyl pyrrolidone/ dextran, polyethylene glycol/hydroxymethyl cellulose, polyethylene glycol/ethylhydroxyethyl cellulose, polyethylene glycol/hydroxypropyl methyl cellulose. As described in part hereinbefore, pseudo-biphasic refers to the presence of two types of polymeric pseudophases which exist in the monophase region of water/polymer/polymer, and water/polymer/polymer/salt phase diagrams. Suitable examples of such hydrophobic polymers include polypropylene glycol, preferably of low-molecular weight, polymethylene glycol and polybutylene glycol. Higher molecular weight polymers can also be used as long as the polymers do not act as a flocculent.

The pseudo-biphasic method of the invention does not require the use of salt to achieve separation of the clay from the impurity mixture; however, a salt is preferably added as described above to further assist the separation of impurities from the clays. Most preferably the second sequentially added polymer is provided after addition of the water-soluble polymer (note: both polymers added in this preferred form of the invention can be water soluble and still be operative for the purpose if this invention). The second added polymer is adsorbed onto the clay impurities, with the clay adsorption sites blocked by the first polymer, in order to achieve more selective adsorption and hence better particle/particle separation. Once the polymer is added, the resulting slurry is typically mixed for about 2 to 10 minutes, and the temperature is preferably between about 40 to 70° C. The elevated temperature helps ensure phase separation of the polymer from the aqueous phase and leads to a density inversion. The density inversion of the polypropylene glycol is significant because the mineral impurities and the polymer are then both separated from the dispersed clay phase, preferably by centrifugation or by use of a hydrocyclone. For example, when polypropylene glycol is used, the amount of polypropylene glycol that is used is typically between about 2 to 5 weight percent based on the weight of the dispersed solids. The elevated temperatures can also lead to partial dehydration of metal oxide surfaces such as quartz, crystalline opals, and the aluminum oxide edges on nonexfoliated clay aggregates. Partial dehydration of the metal oxide surfaces promotes the adsorption of polymer onto these surfaces. The process also involves clay recovery, preferably through use of either a hydrocyclone or decanting centrifuge, or also possibly use of a disc centrifuge. The process is thus completely compatible with existing clay purification practices.

The process produces a clay product of higher surface chemical purity than that produced by conventional processes and is selective for clay particles that have exfoliated. Both of these properties are important considerations in the preparation of nanocomposite articles of manufacture and are optimized by the instant process.

The following non-limiting examples serve to further illustrate advantages of the disclosed invention.

EXAMPLE 1

Figure 1:
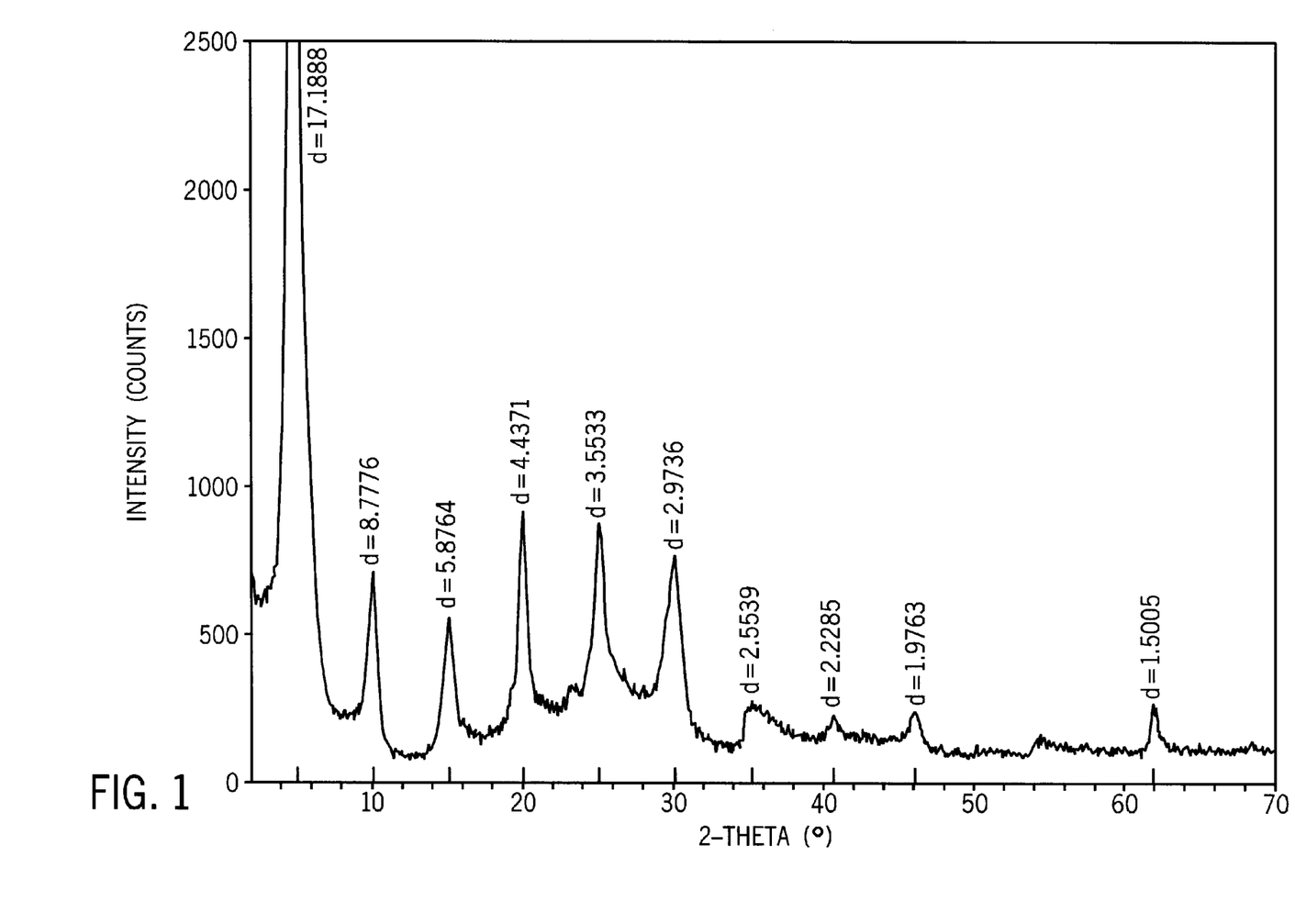
FIG. 1 is an x-ray diffraction pattern of a purified clay in accordance with one form of the invention.
Figure 2:
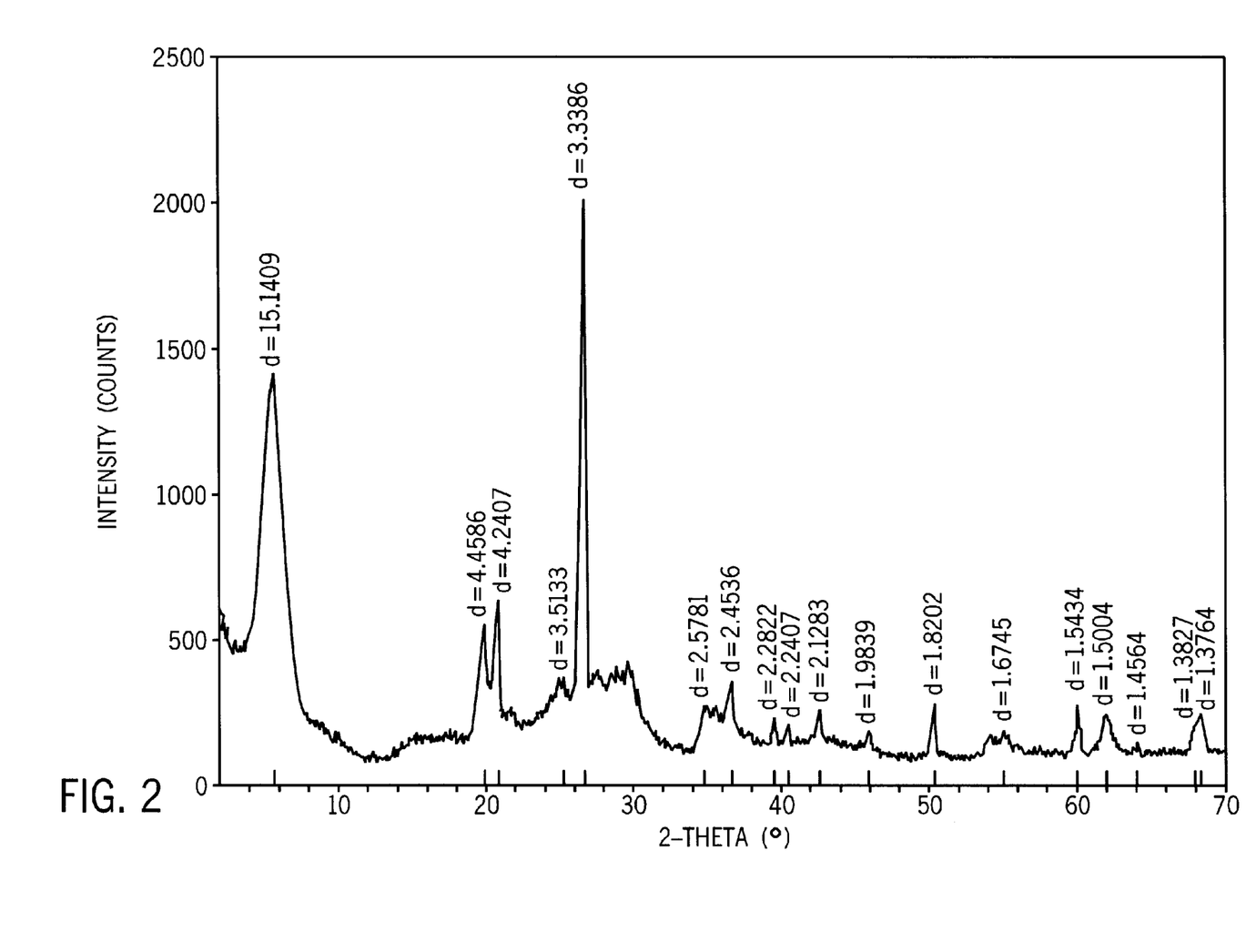
FIG. 2 is an x-ray diffraction pattern of the recovered clay impurities separated from the clay of FIG. 1.
Figure 3:
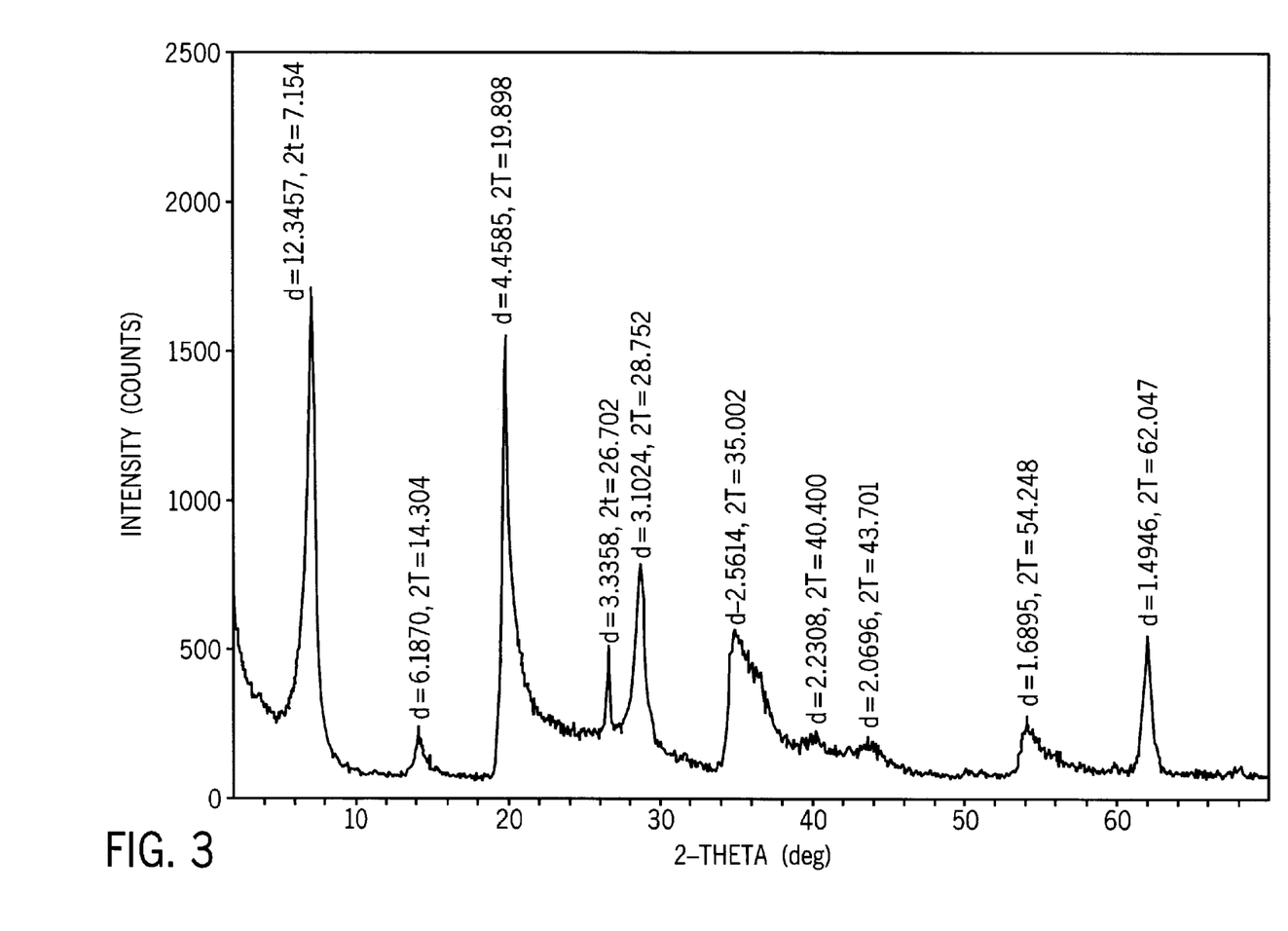
FIG. 3 is an x-ray diffraction pattern of the clay feed.

This example illustrates a pseudo-biphasic embodiment of the present invention without the presence of salt. A commercially purified sodium montmorillonite clay was dispersed in deionized water at a solids concentration of 3 weight percent. The water contained a stoichiometric amount of polyethylene glycol necessary to produce 0.27 gram polyethylene glycol per gram of clay. The slurry was mixed for 20 minutes under moderate shear. Polypropylene glycol, with a molecular weight of 1000, was added and mixed for 2 minutes then heated to 70° C. and then centrifuged in a table top centrifuge for several minutes. The clay suspension was then poured off and dried at 100° C. The impurities were recovered from the centrifuge tube and dried. After drying, the purified clay had a light tan color while the impurity had a deep red color. The products were ground and analyzed by powder x-ray diffraction. The resulting clay product and recovered clay impurities are shown in FIGS. 1 and 2, respectively. The x-ray pattern of the clay feed is shown in FIG. 3 and contains about 0.5 weight percent submicron quartz. Further analysis of the clay impurities by transmission electron microscopy and electron diffraction revealed that the impurity contained the following sub-micron mineral phases: kaolinite, montmorillonite, sodium feldspar, magnetite, zircon, rare earth phosphates, and anatase. The bright red color of the tailings is believed to be due to the presence of the zircon. The clay product resulting from the disclosed process had nondetectable levels of quartz (i.e., no detectable diffraction peak at 3.3 Å) and the basal spacing of the clay was the expected 17 Å indicating that the clay had been completely exfoliated and that the clay galleries contained a bimolecular layer of polyethylene glycol (i.e., a monomolecular layer on each basal surface).

The tailings, however, contained a clay fraction that displayed a d(001) basal spacing of only 15 Å, indicating that this clay had not exfoliated and contained only a monolayer coating within the clay galleries. This material is of no use in the preparation of nanocomposites because of the inability of this material to exfoliate. The x-ray diffraction pattern of the tailings also indicates that the quartz (i.e., diffraction peaks at 3.3 and 4.2 Å) was concentrated in the reject stream.

EXAMPLE 2

A montmorillonite ore containing opal CT and dolomite as the major impurities was dispersed at room temperature in deionized water at a solids concentration of 3 weight percent. The slurry contained a stoichiometric amount of polyethylene glycol to produce 0.27 gram polyethylene glycol per gram of clay. The slurry was mixed for 20 minutes under moderate shear. Polypropylene glycol, with a molecular weight of 1000, was added and mixed for 2 minutes then heated to 70° C. and centrifuged in a table top centrifuge for several minutes. The clay suspension was then poured off and dried at 100° C. The tailings were recovered from the centrifuge tube and dried. After drying, the purified clay was translucent white while tailings had a brilliant white opaque color indicative of a high opal CT concentration.

Figure 4:
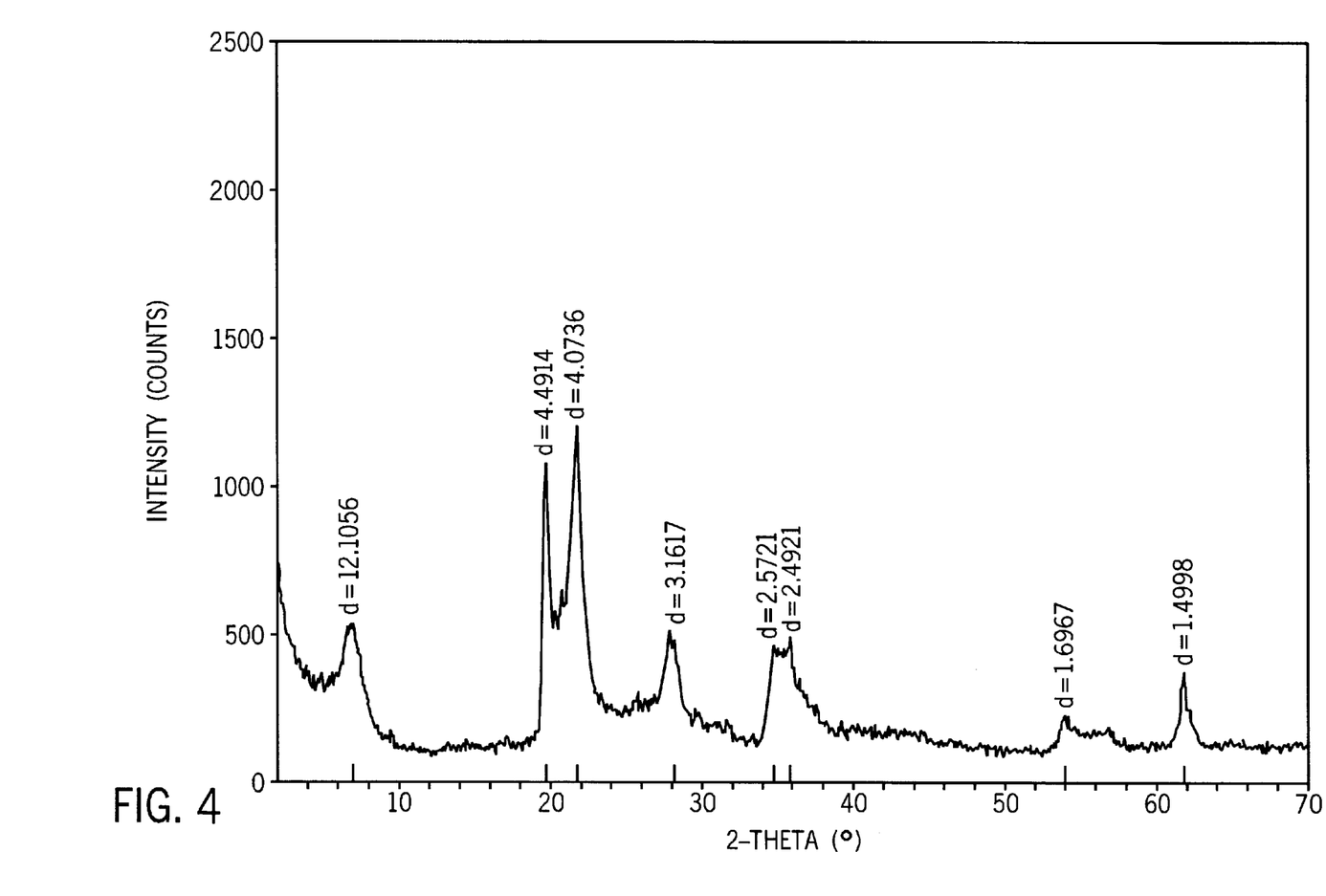
FIG. 4 is an x-ray diffraction pattern of another clay feed.
Figure 5:
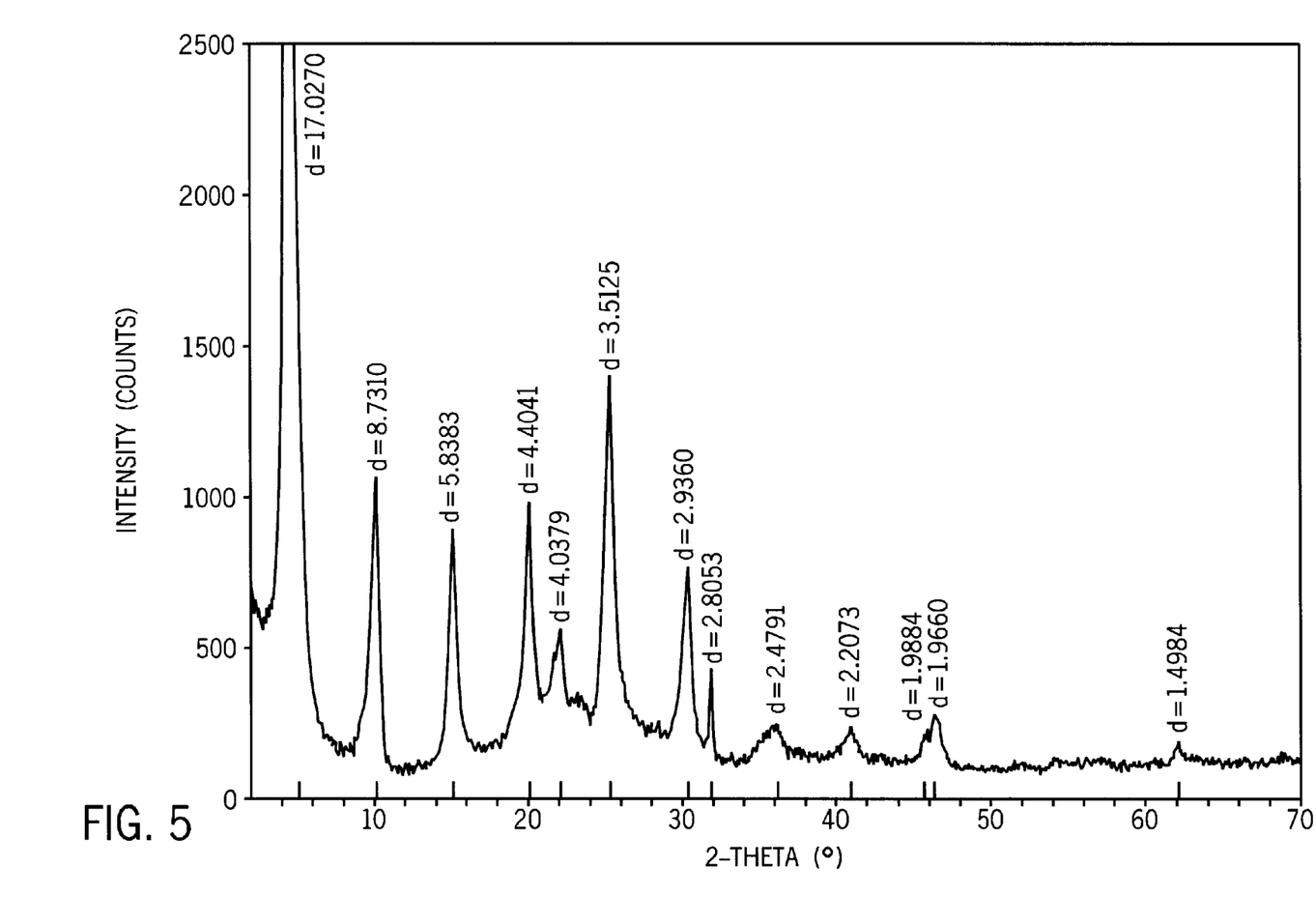
FIG. 5 is an x-ray diffraction pattern of the clay purified from the sample of FIG. 4.
Figure 6:
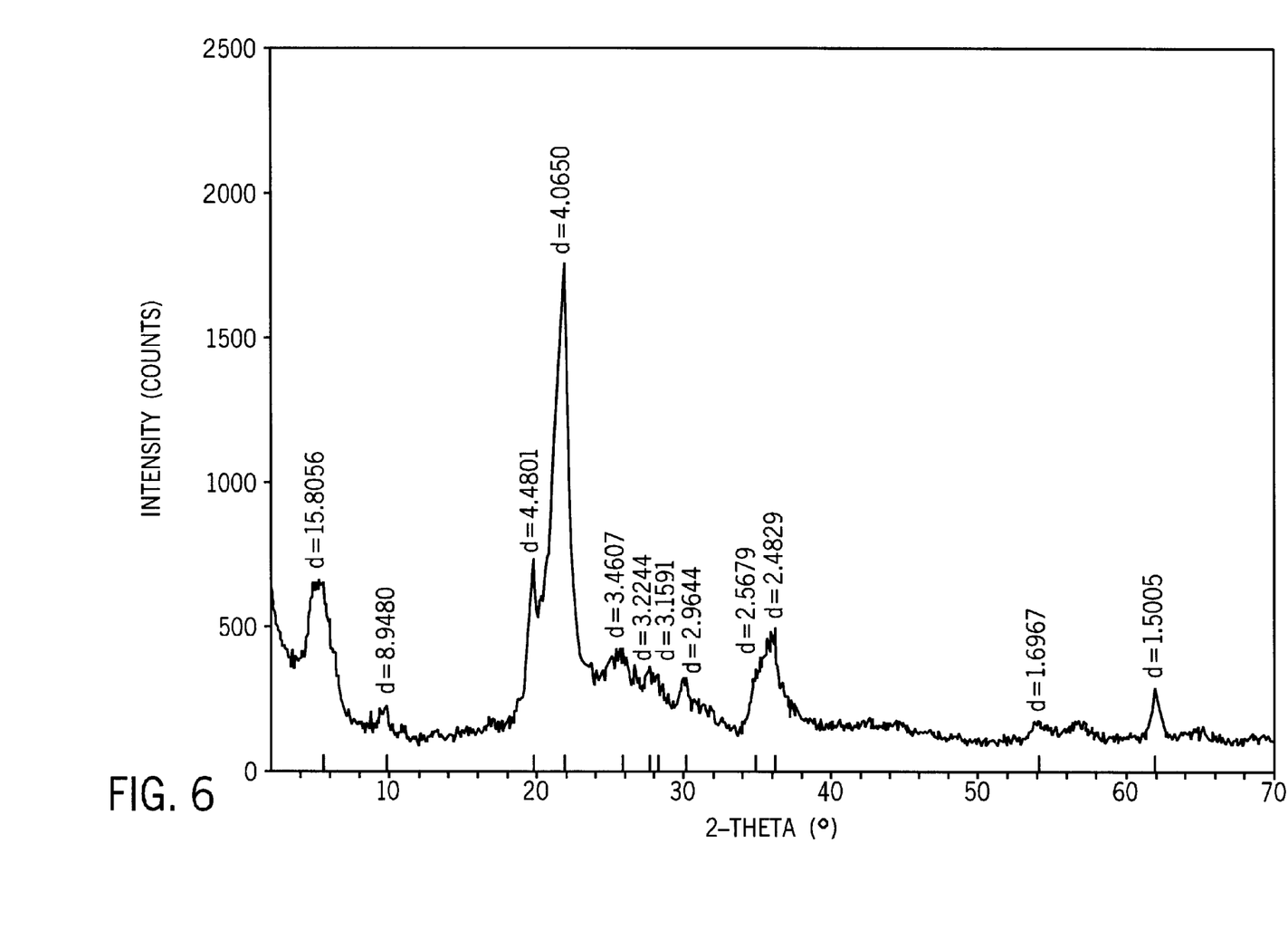
FIG. 6 is an x-ray diffraction pattern of the clay impurities removed from the clay feed of FIG. 4.
Figure 7:
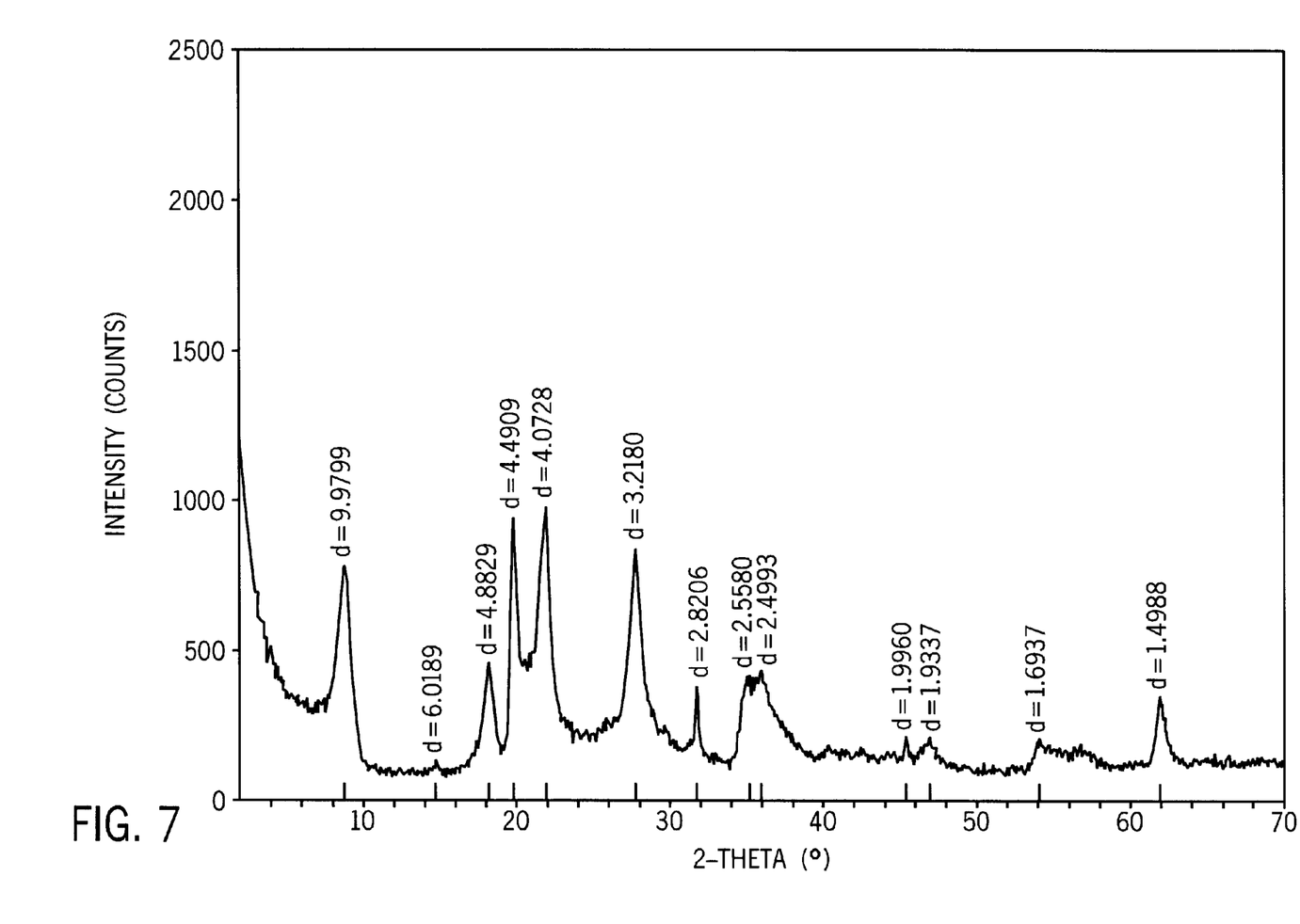
FIG. 7 is an x-ray diffraction pattern of beneficiated montmorillonite produced by conventional separation techniques.

The x-ray patterns of the clay feed, purified clay, and impurities are shown in FIGS. 4–6, respectively. The purified clay shows a d(001) basal spacing of approximately 17 Å indicating that the clay had been completely exfoliated. The opal CT peak is significantly reduced (peaks at 4.0 and 2.48 Å) from that in the clay feed. However, a dolomite peak, not visible in the clay feed, is now observed at 2.8 Å. The x-ray pattern of the tailings shows a significant growth in the opal CT peaks indicating that this mineral phase has been concentrated in the impurity. The d(001) basal spacing of the clay in the tailings is approximately 15.8 Å indicating that this material did not exfoliate. There is no dolomite peak visible. The x-ray pattern of a conventionally purified product made by centrifuging at a cut size of 2 micrometers is shown in FIG. 7. It shows the dolomite peak indicating that the particle size distribution of this mineral impurity overlaps that of the clay. The pattern also shows an opal CT peak that is of approximately equal height to the d(020) peak of the clay (e.g., 4.43 Å).

The procedure described in this example significantly reduced the opal CT concentration below that of conventional size-based separation processes.

EXAMPLE 3

This example illustrates a pseudo-biphasic embodiment of the present invention which further utilizes a salt to improve the separation and recovery of clay from clay impurities. The montmorillonite ore of Example 2, containing opal CT and dolomite as the major impurities, was dispersed in water at room temperature and at a solids concentration of 3 weight percent. The slurry contained a stoichiometric amount of polyethylene glycol to produce 0.27 gram polyethylene glycol per gram of clay and 0.05 weight percent tetrasodium pyrophosphate relative to the weight of the dispersed solids. The slurry was mixed for 20 minutes under moderate shear. Polypropylene glycol, with a molecular weight of 1000, was added at a concentration of 5 weight percent relative to the weight of the dispersed solids. The slurry was mixed for 2 minutes then heated to 70° C. and centrifuged in a table top centrifuge for several minutes. The purified clay was then poured off and dried at 100° C.

Figure 8:
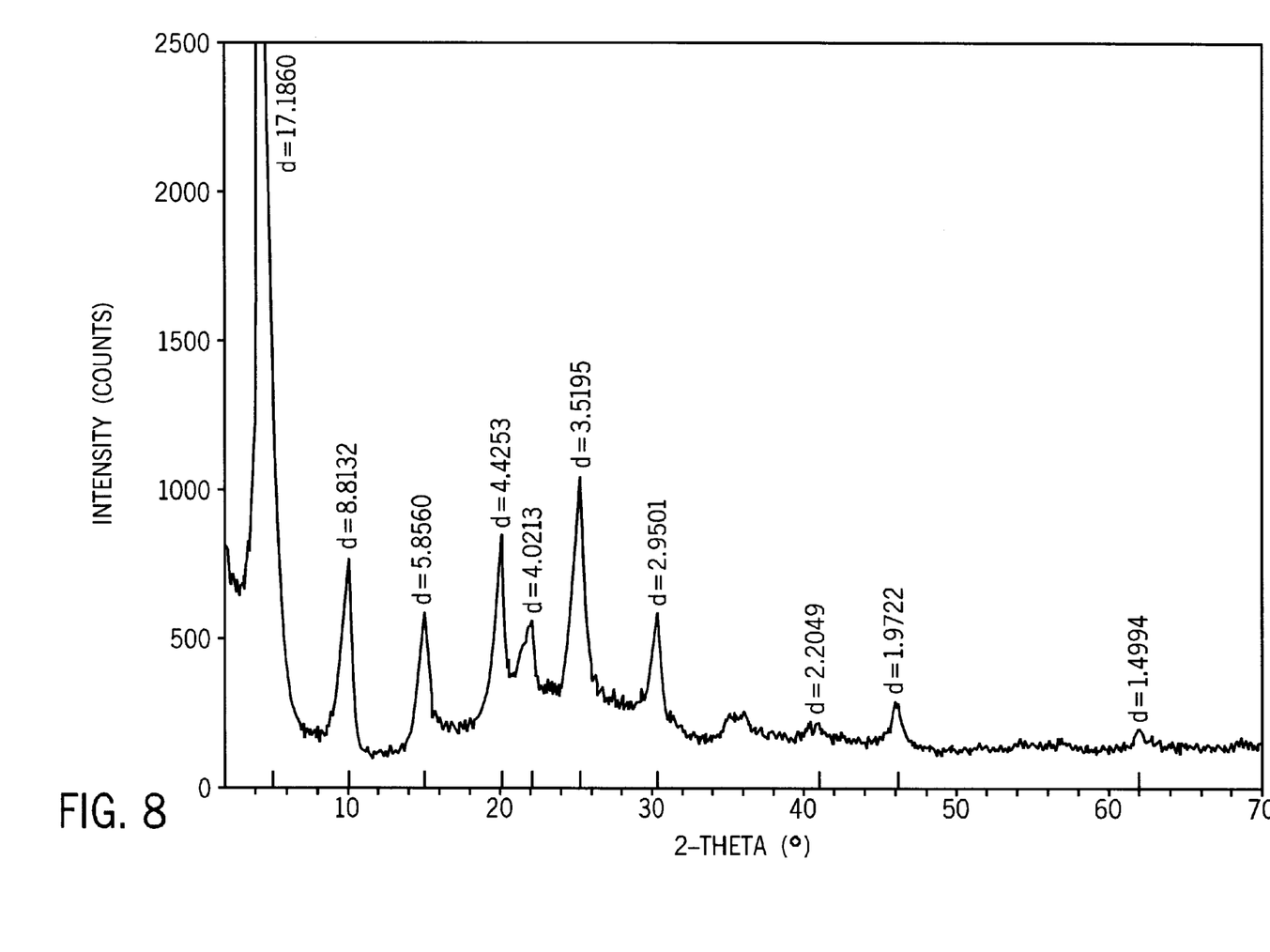
FIG. 8 is an x-ray diffraction pattern of a purified montmorillonite produced according to one embodiment of the present method.

The x-ray pattern of the product is shown in FIG. 8 and indicates a significantly reduced opal CT concentration. However, unlike Example 2, this product does not show a dolomite peak at 2.8 Å. The d(001) basal spacing of the clay is approximately 17 Å indicating that the clay had been completely exfoliated.

EXAMPLE 4

This example demonstrates the effect of another lyotropic salt on the performance of a pseudo-biphasic extraction system. A hectorite sample containing calcite, dolomite, and quartz as the major impurities was dispersed in water at room temperature and at a solids concentration of 3 weight percent. The slurry contained a stoichiometric amount of polyethylene glycol to produce 0.27 gram polyethylene glycol per gram of clay and 1 weight percent sodium carbonate relative to the weight of dispersed solids. The slurry was mixed for 30 minutes under moderate shear. Polypropylene glycol, with a molecular weight of 1000, was added at a concentration of 5 weight percent relative to the weight of the dispersed solids. The slurry was mixed for 5 minutes then heated to 40° C. and centrifuged. The concentration of the impurities in the recovered clay product was below detection by x-ray diffraction.

EXAMPLE 5

This example demonstrates the effect of the combination of low salt concentration and low temperature on the performance of a pseudo-biphasic extraction system. Example 4 was repeated with a sodium carbonate concentration of 0.05 weight percent relative to the concentration of the dispersed solids. As in Example 4, the slurry was heated to 40° C. and centrifuged. However, in this test, the x-ray diffraction data showed no detectable reduction of the impurities in the clay product.

While preferred embodiments have been shown and described, it should be understood that changes and modifications can be made therein without departing from the invention in its broader aspects. For example, it is possible that other materials having similar properties to those already described in this specification could be used by those of ordinary skill in the art while not subtracting from the functionality of the invention. Various features of the invention are defined in the following Claims.

What is claimed is:

1. A method for removing ultra-fine particulate impurities from a mineral mixture using a liquid phase, comprising the steps of:
    dispersing a mineral mixture in a liquid phase which comprises water;
    dispersing a water-soluble polymer in the liquid phase to form a pseudophase;
    allowing particulate impurities of the mineral mixture to separate under the influence of the liquid phase; and
    removing the impurities from the mineral mixture to provide a purified mineral.

2. The method of claim 1 wherein the liquid phase includes a salt.

3. The method of claim 1 wherein the mineral mixture comprises a clay feed which includes the ultra-fine particulate impurities.

4. The method of claim 1 wherein the water-soluble polymer is added in an amount sufficient to form substantially a monomolecular coating on the surface of the purified mineral.

5. The method of claim 2 wherein the salt is selected from the group consisting of sodium carbonate, sodium phosphate, sodium hydroxide, sodium silicate, sodium hexametaphosphate, tetrasodium pyrophosphate, sodium citrate, sodium formate, sodium acetate, sodium oxalate, tetrasodium salt of 1-hydroxyethyliden (1,1-diphosphonic acid), pentasodium salt of diethylenetriamine penta (methylenephosphonic acid), and sodium phytate.

6. The method of claim 3 wherein the mineral mixture comprises a clay feed and the clay of the clay feed comprises a phyllosilicate clay.

7. The method of claim 6 wherein the phyllosilicate clay comprises a clay selected from the group consisting of a kaolin clay and a smectite clay.

8. The method of claim 3 wherein the clay feed includes a clay selected from the group consisting of hectorite, montmorillonite, beidelite, stevensite, and saponite clays.

9. The method of claim 1 wherein the particulate impurities includes particles with an upper-size limit in the range of about 100 mesh.

10. The method of claim 1 wherein the water-soluble polymer is polyethylene glycol.

11. The method of claim 1 wherein the water-soluble polymer is selected from the group consisting of nonionic polymers, nonionic copolymers, and random copolymers.

12. The method of claim 2 wherein the salt leads to increased water structure and polymer aggregation.

13. The method of claim 2 wherein the salt is a lyotropic salt.

14. A method for removing ultra-fine mineral impurities from a mineral mixture using a liquid phase, comprising the steps of:
    dispersing a mineral mixture in a liquid phase comprising water;
    dispersing a water soluble polymer in the liquid phase to form a pseudo-phase;
    dispersing an immiscible polymer at least partially in the liquid phase, whereby a pseudo-biphase is formed;
    allowing a mineral and mineral impurities of the mineral mixture to separate under the influence of the liquid phase; and
    removing the mineral impurities from the mineral mixture to provide a purified mineral.

15. The method of claim 14 wherein the mineral mixture comprises a clay feed.

16. The method of claim 14 further comprising the step of mixing the dispersed mineral mixture, the water-soluble polymer, and the immiscible polymer at a temperature in the range of about 40 to 70° C. for a period of time sufficient to establish equilibrium.

17. The method as defined in claim 14 wherein the pseudophase is heated, while mixing, to a temperature for a time sufficient to complete selective adsorption of the polymers onto particle surfaces of the mineral mixture.

18. The method of claim 14 wherein the liquid phases comprises a salt.

19. The method of claim 18 wherein the salt is selected from the group consisting of sodium carbonate, sodium phosphate, sodium hydroxide, sodium silicate, sodium hexametaphosphate, tetrasodium pyrophosphate, sodium citrate, sodium formate, sodium acetate, sodium oxalate, tetrasodium salt of 1-hydroxyethyliden (1,1-diphosphonic acid), pentasodium salt of diethylenetriamine penta (methylenephosphonic acid), and sodium phytate.

20. The method of claim 14 wherein the mineral impurities that are removed are selected from the group consisting of nonexfoliated clays, non-clay silicates, oxides, hydroxides, carbonates, sulfates, sulfides, phosphates and zeolites and wherein the purified mineral comprises an exfoliated phyllosilicate.

21. The method of claim 20 wherein the phyllosilicate comprises a clay selected from the group consisting of a serpentine-kaolin and a smectite.

22. The method of claim 21 wherein the smectite is selected from the group consisting of hectorite, montmorillonite, beidelite, stevensite, and saponite clays.

23. The method of claim 14 wherein the mineral impurities have a particle size with an upper-size limit in the range of about 100 mesh.

24. The method of claim 14 wherein the water-soluble polymer comprises polyethylene glycol.

25. The method of claim 15 wherein the water soluble polymer is added in a sufficient amount to form a substantially monomolecular coating on the surface of the clay feed.

26. The method of claim 14 wherein the combination of polymers comprising the pseudo-biphase are immiscible with each other.

27. The method of claim 14 wherein the polymers comprising the pseudo-biphase include low molecular weight polyethylene glycol and polypropylene glycol.

28. The method of claim 27 wherein the low molecular weight polypropylene glycol is used in an amount of about two to five weight percent based on the weight of the dispersed mineral mixture.

29. The method of claim 14 wherein the polymers comprising the pseudo-biphase are selected from the group consisting of nonionic polymers, nonionic copolymers and random copolymers.

30. The method of claim 18 wherein the salt leads to increased water structure and polymer aggregation.

31. The method of claim 18 wherein the salt is a lyotropic salt.

* * * * *